June 10, 1941.  H. WERRMANN  2,244,751
METHOD AND ARRANGEMENT FOR TESTING AMPLIFIERS
Filed Feb. 24, 1939
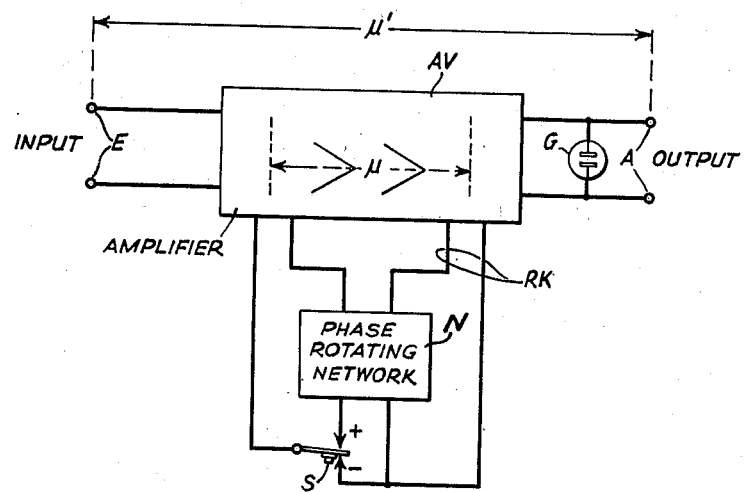
INVENTOR
HELLMUT WERRMANN
BY
ATTORNEY Patented June 10, 1941

2,244,751

UNITED STATES PATENT OFFICE 2,244,751

METHOD AND ARRANGEMENT FOR TESTING AMPLIFIERS

Hellmut Werrmann, Berlin-Charlottenburg, Germany, assignor to "Fides" Gesellschaft fur die Verwaltung und Verwertung von Gewerblichen Schutzrechten, m. b. H., Berlin, Germany, a corporation of Germany Application February 24, 1939, Serial No. 258,196
In Germany March 10, 1938

2 Claims. (Cl. 179—171)

Amplifiers which are to satisfy exacting demands as to linearity in view of the large width of the frequency band to be transmitted, are rendered linear, as is known, by using a negative feed back. This means of obtaining linearity is not only employed in amplifiers for carrier current-telephone systems but also more especially in antenna amplifiers.

The negative feed back has the effect that the total amplification obtained, having considered the decrease in amplification due to the negative feed back, can be maintained constant within wide limits even though the amplification properties of the tube should decrease. The overall amplification remains actually the same but the noise factor becomes greater owing to the decreasing negative feed back. But since the said noise factor must in no case exceed the prescribed value so as to provide a distortion-free amplification, it is necessary regularly to test the tubes in regard to their amplification properties.

If this test were to be carried out through the ordinary measurements of the tube properties, the tubes would have to be idle for some time and, furthermore, this test could only be carried out by experts. But such experts are hard to find, especially for testing high power antenna amplifiers.

The method, according to the present invention, is essentially simpler and provides for transforming the negative feed back of the amplifier into a positive feed back of such value that natural oscillations set in only if the amplifier tube has the amplification properties necessary for the required linearity. Since a feed back circuit is already present, a comparatively simple circuit arrangement is sufficient to provide the necessary phase rotation of the feed back and thus the positive feed back required for determining the point of oscillation. The initiation of the natural oscillations can be indicated by means of a corresponding measuring instrument or more simply, by the light of an ignited glow tube. The switchings necessary to transform the negative feed back into a positive feed back may be suitably controlled by means of a push button. If the glow tube is so arranged that it is clearly visible when operating the button, i. e., if it is placed, for instance, near the push button the necessary test can be carried out very quickly simply by depressing the button.

In the sole figure of the drawing a circuit arrangement is shown which includes an antenna amplifier AV. A feed back circuit RK is inserted between the input terminals and output terminals E and A, respectively, of the amplifier. This circuit normally serves for establishing the negative feed back. The latter has the effect that the amplification factor $\mu$ of the amplifier which would exist without the feed back, decreases to the value $\mu'$. As already pointed out, the negative feed back maintains constant the amplification degree $\mu'$. However, in order to prevent the noise factor from exceeding the permissible limit, the amplification degree $\mu$ must not fall below a certain lower limit value.

In order to practice the method according to the invention the "phase rotating network" (so designated in the drawing) and the switch S are in the feed back circuit. If the switch is moved from the lower position designated by (—) into the upper position indicated by (+), the network N becomes effective and brings about the phase rotation necessary to convert the negative feed back into a positive feed back. The damping function of the network, which may, in its simplest form, be performed by a transformer, is so arranged that natural oscillations set in only when the amplification $\mu$ has the required minimum value. The glow tube G serves for indicating the natural oscillations.

I claim:

1. Method of testing a vacuum tube amplifier including a negative feed back circuit therein to obtain linearity thereof, characterized in that the negative feed back is converted into a positive feed back of such value that natural oscillations are produced only if the amplifier tube has the amplification properties necessary to provide the required linearity.

2. In a vacuum tube amplifier having a negative feedback channel for improving the response of said amplifier, the method of testing said amplifier which comprises converting the feedback in said channel into positive feedback whereby said amplifier is conditioned to produce oscillations, adjusting said feedback so that oscillations will take place only if the amplification factor of the tubes in said amplifier exceeds a predetermined minimum and observing whether said amplifier oscillates.

HELLMUT WERRMANN.